United States Patent [19]
König

[11] Patent Number: 5,558,821
[45] Date of Patent: Sep. 24, 1996

[54] METHOD AND APPARATUS FOR PURIFYING THE EXHAUST AIR OF INSTALLATIONS FOR CONSOLIDATING MOLTEN SUBSTANCES

[75] Inventor: Axel König, Stuttgart, Germany

[73] Assignee: Santrade Ltd., Luzern, Switzerland

[21] Appl. No.: 436,461

[22] PCT Filed: Aug. 5, 1994

[86] PCT No.: PCT/EP94/02610

§ 371 Date: Jul. 18, 1995

§ 102(e) Date: Jul. 18, 1995

[87] PCT Pub. No.: WO95/08390

PCT Pub. Date: Mar. 30, 1995

[30] Foreign Application Priority Data

Sep. 25, 1993 [DE] Germany ............ 43 32 686.2

[51] Int. Cl.⁶ .................................... B29B 9/10
[52] U.S. Cl. .................... 264/13; 264/5; 264/8; 425/6; 425/8
[58] Field of Search ............ 264/5, 8, 13, 299, 264/40.1; 425/6, 8

[56] References Cited

U.S. PATENT DOCUMENTS

| | | |
|---|---|---|
| 3,473,740 | 10/1969 | Davis . |
| 5,286,181 | 2/1994 | Schwager ............... 425/8 |
| 5,295,799 | 3/1994 | Prewitt ................... 425/8 |
| 5,332,378 | 7/1994 | Harreither ............... 425/8 |

FOREIGN PATENT DOCUMENTS

| | | |
|---|---|---|
| 3124200 | 1/1983 | Germany . |
| WO87/03216 | 6/1987 | WIPO . |
| WO91/16151 | 10/1991 | WIPO . |

*Primary Examiner*—Mary Lynn Theisen
*Attorney, Agent, or Firm*—Burns, Doane, Swecker & Mathis, L.L.P.

[57] ABSTRACT

A molten substance is consolidated by being deposited onto a cooling belt which conveys the substance through a space formed between the belt and an overhead hood. The formation of exhaust dust from the substance is minimized by controlling heaters in the hood to vary the temperature along the space such that the saturation pressure in the space closely matches the vapor pressure of the substance as the substance travels through the space. Also, the hood is placed close to the cooling belt to minimize the velocity of vapors emitted from the substance within the space.

11 Claims, 1 Drawing Sheet

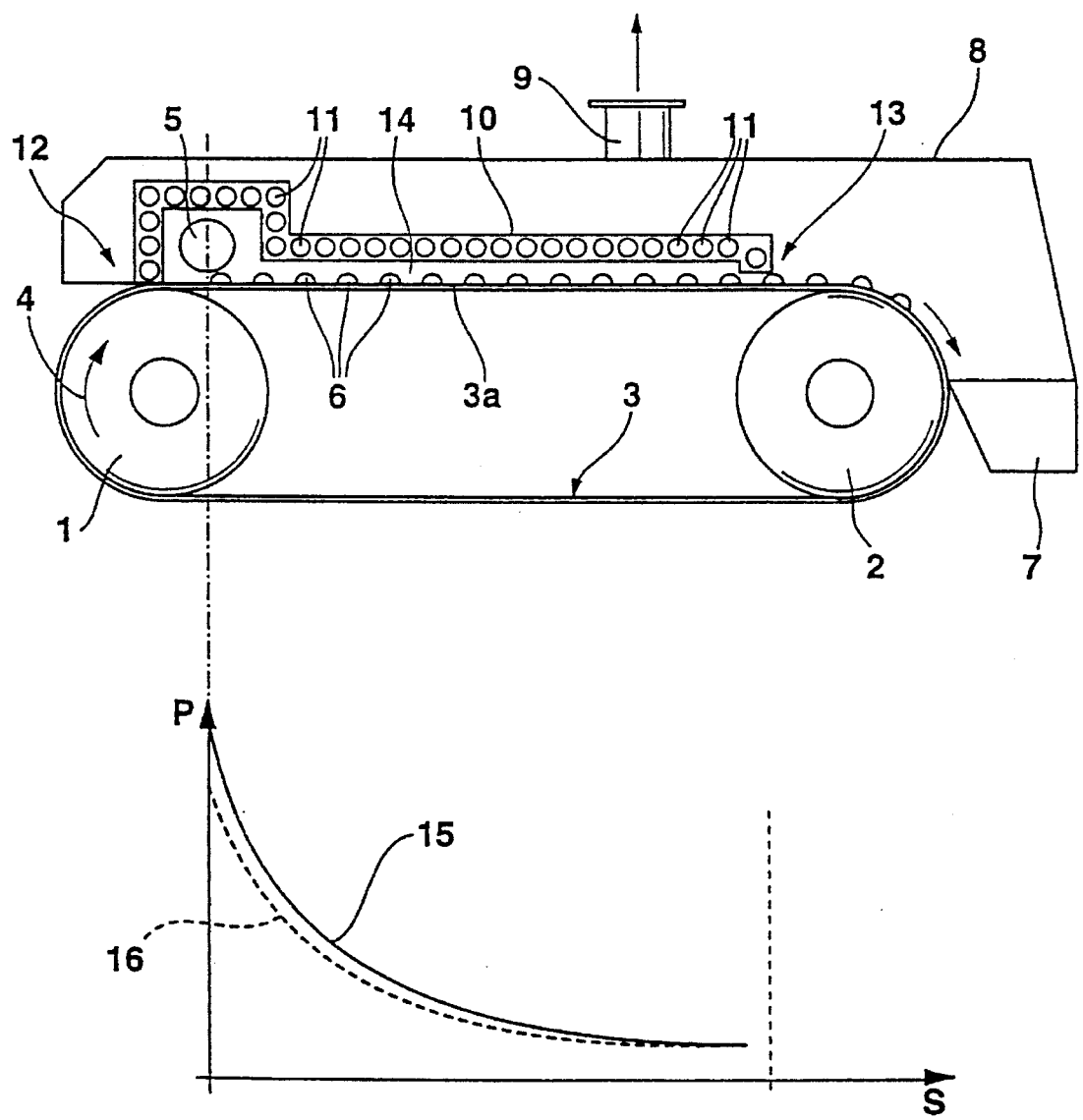

METHOD AND APPARATUS FOR PURIFYING THE EXHAUST AIR OF INSTALLATIONS FOR CONSOLIDATING MOLTEN SUBSTANCES

BACKGROUND OF THE INVENTION

The invention concerns a method and an apparatus for purifying the exhaust air of installations for consolidating molten substances that are delivered onto cooling surfaces, in particular onto a cooling belt, and solidify there.

Methods and apparatuses of this kind are known (EP 0 012 192 BI). In devices of this kind used in practice, in order to extract the vapors released by the molten substance, for example sulfur vapors, the entire device is covered by an extraction hood which ensures that the resulting exhaust air can be removed and purified in a defined manner. This is generally done by means of downstream filters, which are relatively complex. A disadvantage of the known purification methods is that the quantities of dust removed with the exhaust air, which can be considerable, are lost for purposes of product generation.

The underlying object of the invention is to implement a method and an apparatus of the aforesaid kind in such a way that less product dust occurs from the outset.

SUMMARY OF THE INVENTION

This object is achieved by the method according to the invention by the fact that the pressure difference between the vapor pressure of the molten substance after delivery onto the cooling surfaces and the saturation pressure in the space through which the solidifying molten substance passes, as well as the flow velocity of the vapors given off by the molten substance, are kept as small as possible.

With this configuration the precipitated quantity (proportional to the difference in vapor pressure) that occurs as dust can be kept small from the outset. If the vapor flow velocity, on which the separated quantity also depends proportionally, also remains low, it then becomes possible to prevent most dust production, so that complex downstream purification devices for the exhaust air can largely be dispensed with. In a development of the method according to the invention, the saturation pressure is matched, in a simple manner, to the vapor pressure ratio of the molten substance as it cools by heating the space through which the molten substance passes. This feature makes it possible, especially in the case of materials such as sulfur which crystallize readily, to match the respective active pressure of the product as closely as possible to the saturation pressure, which depends on temperature. The quantity of product crystallizing out thus becomes smaller, less dust occurs, and purification can be less complex.

The method according to the invention can be performed in a particularly simple manner, with an apparatus that possesses a delivery device for the molten substance and a cooling belt circulating beneath it, on which the molten substance is guided to a removal point and is thereby solidified, if the delivery device and the cooling belt are covered by a hood provided with heating devices, the heating devices of which can be controlled such that the temperature beneath the hood can be modified in the direction in which the belt travels. The hood can be placed as close as possible to the cooling belt so that the space available for the vapors remains as small as possible and the flow velocity of the vapors that would otherwise rise upward is minimized. Lastly, it is also advantageous to provide sealing means at the entry and exit point between cooling belt and hood so as to keep leakage as low as possible and eliminate dust production in this manner as well. In a particularly simple embodiment, the hood can consist of a double-walled panel, running parallel to the cooling belt, with controllable heating elements set in it.

BRIEF DESCRIPTION OF THE DRAWING

The invention is shown in the drawing with reference to an exemplary embodiments, and will be explained below.

The single drawing schematically shows an apparatus for producing granulated material from a molten substance, which operates with a cooling belt. Associated with the schematically depicted device is a diagram showing the change in vapor pressure of the molten substance delivered onto the cooling belt along a portion of the cooling travel.

DETAILED DESCRIPTION OF A PREFERRED EMBODIMENT OF THE INVENTION

It is evident from the depiction that above an endless cooling belt (3) which is guided around the reversing drums (1 and 2), consists of a steel belt, and circulates in the direction of the arrow (4), there is arranged a so-called rotoformer (5). The rotoformer comprises (in a manner not depicted in greater detail) of two telescoped tubes arranged coaxially with one another, the outer of which is provided with a plurality of outlet openings and the inner with a slit facing the upper run (3a) of the cooling belt (3). The product is supplied to this rotoformer at its end, in a heated and molten state, and because of the relative movement of the two tubes emerges downward in droplet form, where the droplet-shaped molten substance takes on a tablet shape (6) and solidifies into a solid, tablet-shaped granulated material on the upper run (3a) of the cooling belt (3) as it travels further. For this purpose, the cooling belt (3) is provided with a cooling device (not depicted), that can consist for example of spray nozzles, the sprayed streams from which are directed from below against the upper run (3a) of the steel belt (3), and provide the heat dissipation required to cool the tablets (6).

The solidified tablets fall off the cooling belt in the region of the reversing drum (2), and can be processed further from a collecting vessel (7). The entire cooling belt (3) and rotoformer (5) are enclosed by an extraction hood (8) that has an extraction connector (9) for the exhaust air, leading to purification filters (not shown further). Specifically, if the device shown is used to pelletize molten substances, for example sulfur, whose vapors are environmentally hazardous, the exhaust air must be removed and purified.

To prevent the vapors of the initially still hot product, produced at the point where the product is delivered onto the cooling belt (3)—i.e. in the vicinity of the rotoformer (5)—and during its further travel, from occurring as dust during further cooling and requiring disposal, in the exemplary embodiment the rotoformer and the upper run (3a) of the cooling belt (3) adjacent thereto are covered by an additional hood (10). This hood (10) consists substantially— with the exception of the region of the rotoformer (5)—of a double-walled panel that runs parallel to the upper run (3a) with the closest possible spacing. This hood (10) is equipped with heating elements (11), distributed over its entire length, that are all individually controllable. Provided at the entry point (12) between hood (10) and cooling belt (3) and at the exit point (13) are sealing means so as to seal off the interior (14) beneath the hood (10) as well as possible from the outside. For this purpose, there is provided at the exit point (13) a narrow slit which is just large enough to allow the tablets (6) to emerge from the interior (14) of the hood (10).

Associated with the apparatus shown in the Figure is the vapor pressure curve for a molten substance, for example sulfur, conveyed to the rotoformer (5). It is evident that this vapor pressure is greatest at the delivery point from the rotoformer (5), where the molten substance temperature is also still highest, and that the vapor pressure continuously decreases over the cooling travel distance (S).

According to the invention, it is proposed that the temperature in the interior (14) of the hood (10) be matched to this vapor pressure curve (15) by controlled heating of the heating elements (11), i.e. that the temperature in the space (14) be greatest in the region of the rotoformer (5), and least in the region of the exit slit (13). With this feature the saturation pressure, which depends on temperature, can be influenced so that it can be largely matched to the vapor pressure curve (15). This means that the pressure differential between the vapor pressure (depicted by the vapor pressure curve (15)) of the product (the tablets (6)), and the saturation pressure (16) (plotted with a dashed line in the Figure) resulting from heating inside the hood (10), remains very small. With the embodiment selected, during its cooling travel the product, i.e. the tablets (6), therefore gives off almost no vapor that can occur in the form of dust after cooling. Therefore, a substantially smaller proportion of dust is also withdrawn from the extraction connector (9) of the extraction hood (8), as compared with known devices. The purification devices can therefore be made correspondingly simpler.

It is also evident from the depiction in the Figure that the space (14) beneath the hood (10) is very small, and that therefore almost no space is available for the vapors arising from the product (6). The flow velocity of these vapors therefore also remains very low. Since the precipitation quantity depends not only on pressure differential but also on flow velocity, this feature also means that very little product dust requiring disposal is produced.

I claim:

1. In a method of consolidating a molten substance by depositing the substance onto a cooling surface, the improvement comprising minimizing the formation of exhaust dust from the substances including the steps of:

A) conducting the deposited substance through a space, and

B) controlling a saturation pressure within the space so as to minimize a difference between the saturation pressure and a vapor pressure of the substance as the substance travels through the space.

2. The method according to claim 1, wherein step B comprises varying the temperature within the space such that the saturation pressure closely matches a varying vapor pressure of the substance.

3. The method according to claim 2, wherein the temperature in the space is gradually reduced in the direction of travel of the substance through the space.

4. The method according to claim 1, further including the step of minimizing a flow velocity of vapors emitted by the substance.

5. In an apparatus for consolidating a molten substance by depositing the molten substance onto a cooling conveyor belt, the improvement comprising a structure for minimizing the formation of exhaust dust from the substance, the structure including:

a cooling surface for receiving and conveying the molten substance;

a hood overlying the cooling surface to form therewith a space in which the substance is conveyed; and heaters for controlling the temperature in the space such that a difference between the saturation pressure in the space and a vapor pressure of the substance is minimized as the substance travels through the space.

6. The apparatus according to claim 5, wherein the heaters are of gradually reduced temperature so that the temperature in the space is progressively reduced in the direction of travel of the substance.

7. The apparatus according to claim 6, wherein the heaters are independently controllable.

8. The apparatus according to claim 5, wherein the hood is hollow and the heaters are inside the hollow hood.

9. The apparatus according to claim 5, wherein the hood is disposed immediately above the cooling surface.

10. The apparatus according to claim 9, wherein the cooling surface is a conveyor belt.

11. The apparatus according to claim 10, wherein the entry and exit points where the conveyor belt enters and exits the space, respectively, are of minimal size to resist the escape of gas from the space.

* * * * *